(12) United States Patent
Puiu

(10) Patent No.: US 7,201,264 B2
(45) Date of Patent: Apr. 10, 2007

(54) TORQUE TRANSFER MECHANISMS FOR POWER-OPERATED CLUTCH ACTUATOR

(75) Inventor: Dumitru Puiu, Sterling Heights, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 109 days.

(21) Appl. No.: 11/032,214

(22) Filed: Jan. 10, 2005

(65) Prior Publication Data

US 2006/0081437 A1    Apr. 20, 2006

Related U.S. Application Data

(63) Continuation-in-part of application No. 10/968,763, filed on Oct. 19, 2004, now Pat. No. 7,104,379.

(51) Int. Cl.
F16D 13/54    (2006.01)
F16D 25/08    (2006.01)

(52) U.S. Cl. ............... 192/70.23; 192/85 C; 192/93 A

(58) Field of Classification Search ................ None
See application file for complete search history.

(56) References Cited

U.S. PATENT DOCUMENTS

| | | | |
|---|---|---|---|
| 2,883,008 A * | 4/1959 | Lucker | 188/71.3 |
| 4,611,691 A * | 9/1986 | Gornall | 188/71.8 |
| 4,862,769 A | 9/1989 | Kogal et al. | |
| 4,895,236 A | 1/1990 | Sakakibara et al. | |
| 5,224,906 A | 7/1993 | Sturm | |
| 5,323,871 A | 6/1994 | Wilson et al. | |
| 5,407,024 A | 4/1995 | Watson et al. | |
| 5,423,235 A | 6/1995 | Botterill et al. | |
| 6,454,068 B2 * | 9/2002 | Arai et al. | 192/85 CA |
| 6,595,338 B2 | 7/2003 | Bansbach et al. | |
| 6,651,793 B2 | 11/2003 | Reisinger | |
| 6,659,250 B2 | 12/2003 | Nestler et al. | |
| 6,766,889 B1 * | 7/2004 | Pennycuff | 180/249 |
| 6,793,055 B2 * | 9/2004 | Kasuya et al. | 192/85 CA |

FOREIGN PATENT DOCUMENTS

| | | |
|---|---|---|
| JP | 6218117 | 1/1990 |
| JP | 3066927 | 3/1991 |

* cited by examiner

Primary Examiner—Rodney H. Bonck
(74) Attorney, Agent, or Firm—Harness, Dickey & Pierce, P.L.C.

(57) ABSTRACT

A clutch actuator for controlling engagement of a friction clutch and having a first actuator plate rotatable about an axis, a second actuator plate adjacent to the first actuator plate, and a ballramp unit disposed between the first and second actuator plates. A piston assembly acts to induce rotation of the first actuator plate relative to the second actuator plate. Relative rotation between the first actuator plate and the second actuator plate induces linear movement of one of the first and second actuator plates along the axis to regulate engagement of the friction clutch.

35 Claims, 13 Drawing Sheets

TORQUE TRANSFER MECHANISMS FOR POWER-OPERATED CLUTCH ACTUATOR

CROSS-REFERENCE TO RELATED APPLICATIONS

This application is a continuation-in-part of U.S. patent application Ser. No. 10/968,763 filed on Oct. 19, 2004 now U.S. Pat. No. 7,104,379.

FIELD OF THE INVENTION

The present invention relates generally to power transfer systems and, more particularly, to torque transfer mechanisms having a clutch actuator for actuating a clutch assembly in a power transfer system.

BACKGROUND OF THE INVENTION

Power transfer systems of the type used in motor vehicles including, but not limited to, four-wheel drive transfer cases, all-wheel drive power take-off units (PTU), limited slip drive axles and torque vectoring drive modules are commonly equipped with a torque transfer mechanism. In general, the torque transfer mechanism functions to regulate the transfer of drive torque between a rotary input component and a rotary output component. More specifically, a multi-plate friction clutch is typically disposed between the rotary input and output components and its engagement is varied to regulate the amount of drive torque transferred therebetween.

Engagement of the friction clutch is varied by adaptively controlling the magnitude of a clutch engagement force that is applied to the multi-plate friction clutch via a clutch actuator system. Many traditional clutch actuator systems include a power-operated drive mechanism and an operator mechanism. The operator mechanism typically converts the force or torque generated by the power-operated drive mechanism into the clutch engagement force which, in turn, can be further amplified prior to being applied to the friction clutch. Actuation of the power-operated drive mechanism is controlled based on control signals generated by a control system.

Currently, a large number of the torque transfer mechanisms used in motor vehicle driveline applications are equipped with an electrically-controlled clutch actuator that can regulate the drive torque transferred as a function of the value of the electric control signal applied thereto. In some applications, an electromagnetic device is employed as the power-operated drive mechanism of the clutch actuator. For example, U.S. Pat. No. 5,407,024 discloses use of an electromagnetic coil that is incrementally activated to control movement of a ballramp operator mechanism for applying the clutch engagement force to the friction clutch. Likewise, Japanese Laid-Open Patent Application No. 62-18117 discloses an electromagnetic actuator arranged to directly control actuation of the friction clutch.

As an alternative, the torque transfer mechanism can employ an electric motor as the power-operated drive mechanism of the clutch actuator. For example, U.S. Pat. No. 5,323,871 discloses a clutch actuator having an electric motor that controls angular movement of a sector cam which, in turn, controls pivoted movement of a lever arm used to apply the clutch engagement force on the friction clutch. Likewise, Japanese Laid-Open Publication No. 63-66927 discloses a clutch actuator which uses an electric motor to rotate one cam plate of a ballramp operator mechanism for engaging the friction clutch. Finally, U.S. Pat. Nos. 4,895,236 and 5,423,235, respectively, disclose a clutch actuator with an electric motor driving a reduction gearset for controlling movement of a ballscrew operator mechanism and a ballramp operator mechanism. Finally, commonly owned U.S. Pat. No. 6,595,338 discloses an electrohydraulic clutch actuator for controlling engagement of a friction clutch.

SUMMARY OF THE INVENTION

Accordingly, the present invention is directed toward a clutch actuator that is operable to adaptively regulate engagement of a friction clutch assembly. The clutch actuator includes a power-operated drive mechanism and an operator mechanism. The operator mechanism generally includes a first actuator plate, a second actuator plate, a ballramp unit operably disposed between the first and second actuator plates, and a linear operator for controlling relative angular movement between the first and second actuator plates. Such angular movement causes the ballramp unit to move one of the first and second actuator plates axially for generating a clutch engagement force that is applied to the friction clutch assembly.

Pursuant to a preferred construction, the ballramp unit is integrated into the first and second actuator plates to provide a compact operator mechanism. In addition, the linear operator is disposed between first and second arm segments provided on the corresponding first and second actuator plates. The linear operator may be a dual piston assembly having first and second pistons disposed in a common pressure chamber. The first piston has a first roller engaging a first cam surface formed on the first arm segment of the first actuator plate while the second piston has a second roller engaging a second cam surface formed on the second arm segment of the second actuator plate.

In accordance with another feature, the operator mechanism associated with the clutch actuator of the present invention further includes an apply plate that is disposed adjacent to the second actuator plate and which is axially moveable therewith to apply the clutch engagement force to the friction clutch assembly. In yet another feature, the operator mechanism of the clutch actuator further includes a stop plate that is disposed adjacent to the first actuator plate and which inhibits axial movement of the first actuator plate.

The drive mechanism associated with the clutch actuator of the present invention is operable to control the fluid pressure within the pressure chamber, thereby controlling the position of the first and second pistons and the relative angular position of the first actuator plate relative to the second actuator plate. The drive mechanism includes an electric motor, a ballscrew unit, a gearset interconnecting a rotary output of the motor to a rotary component of the ballscrew unit, and a control piston disposed in a control chamber. The control piston is fixed to an axially moveable component of the ballscrew unit while a fluid delivery system provides fluid communication between the control chamber and the pressure chamber. In operation, the location of the axially moveable ballscrew component within the control chamber controls the fluid pressure within the pressure chamber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred between a first rotary member and a second rotary member. The torque transfer mechanism finds particular application in power transfer systems of the type used in motor vehicle drivelines and which include, for example, transfer cases, power take-off units, limited slip drive axles and torque vectoring drive modules. Thus, while the present invention is hereinafter described in association with one or more particular arrangements for specific driveline applications, it will be understood that the arrangements shown and described are merely intended to illustrate embodiments of the present invention.

Figure 1:
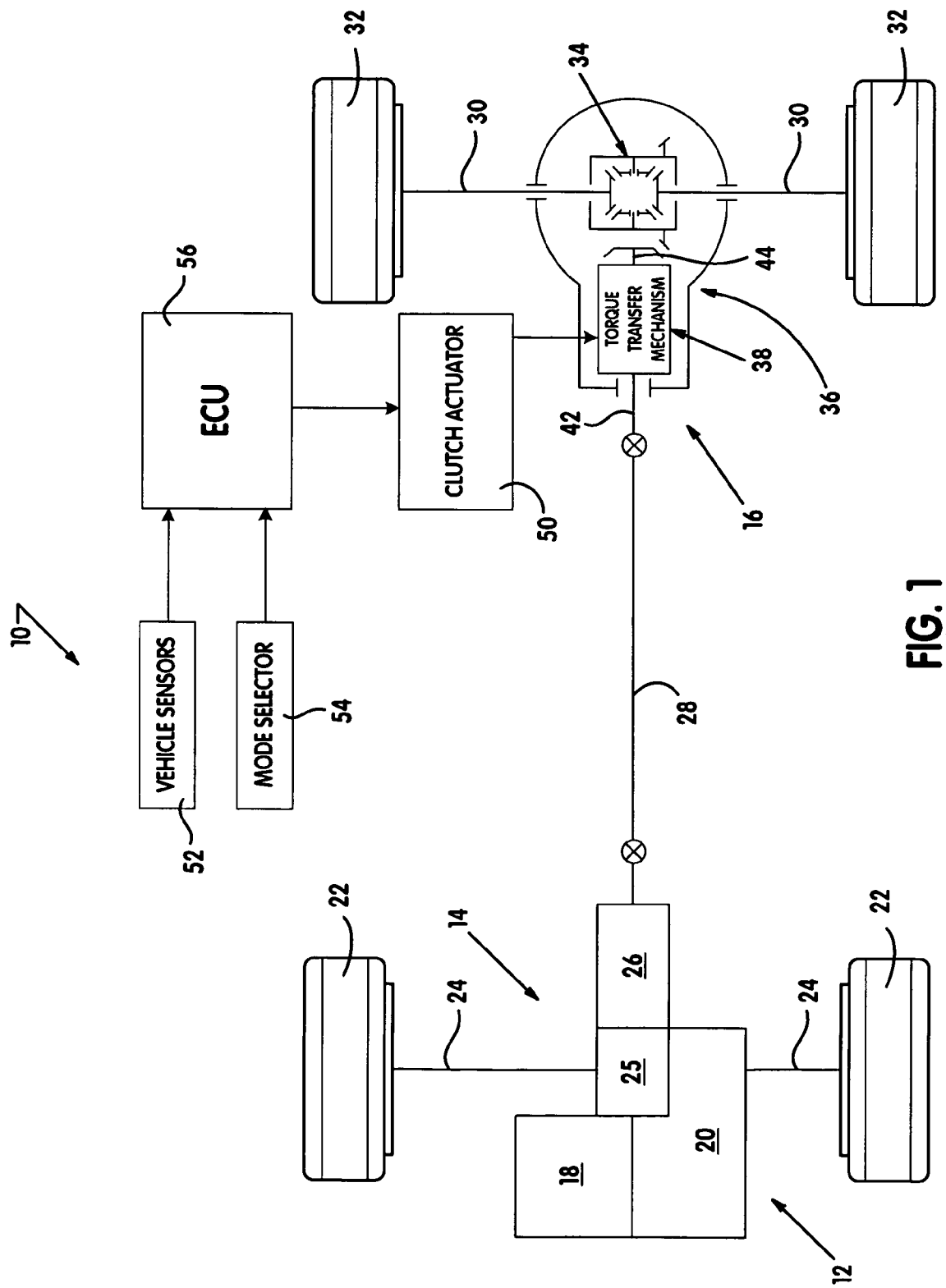
FIG. 1 illustrates an exemplary drivetrain in a four-wheel drive vehicle equipped with a power transfer system.

With particular reference to FIG. 1, a schematic layout of a vehicle drivetrain 10 is shown to include a powertrain 12, a first or primary driveline 14 driven by powertrain 12, and a second or secondary driveline 16. Powertrain 12 includes an engine 18 and a multi-speed transaxle 20 arranged to normally provide motive power (i.e., drive torque) to a pair of first wheels 22 associated with primary driveline 14. Primary driveline 14 further includes a pair of axle shafts 24 connecting wheels 22 to a front differential unit 25 associated with transaxle 20.

Secondary driveline 16 includes a power take-off unit (PTU) 26 driven by the output of transaxle 20, a propshaft 28 driven by PTU 26, a pair of axle shafts 30 connected to a pair of second wheels 32, a rear differential unit 34 driving axle shafts 30, and a power transfer device 36 that is operable to selectively transfer drive torque from propshaft 28 to rear differential unit 34. Power transfer device 36 is shown integrated into a drive axle assembly and includes a torque transfer mechanism 38. Torque transfer mechanism 38 functions to selectively transfer drive torque from propshaft 28 to differential unit 34. More specifically, torque transfer mechanism 38 includes an input shaft 42 driven by propshaft 28 and a pinion shaft 44 that drives differential unit 34.

Vehicle drivetrain 10 further includes a control system for regulating actuation of torque transfer mechanism 38. The control system includes a clutch actuator 50, vehicle sensors 52, a mode select mechanism 54 and an electronic control unit (ECU) 56. Vehicle sensors 52 are provided to detect specific dynamic and operational characteristics of drivetrain 10 while mode select mechanism 54 enables the vehicle operator to select one of a plurality of available drive modes. The drive modes may include a two-wheel drive mode, a locked ("part-time") four-wheel drive mode, and an adaptive ("on-demand") four-wheel drive mode. In this regard, torque transfer mechanism 38 can be selectively engaged for transferring drive torque from input shaft 42 to pinion shaft 44 to establish both of the part-time and on-demand four-wheel drive modes. ECU 56 controls actuation of clutch actuator 50 which, in turn, controls the drive torque transferred through torque transfer mechanism 38.

Figure 2:
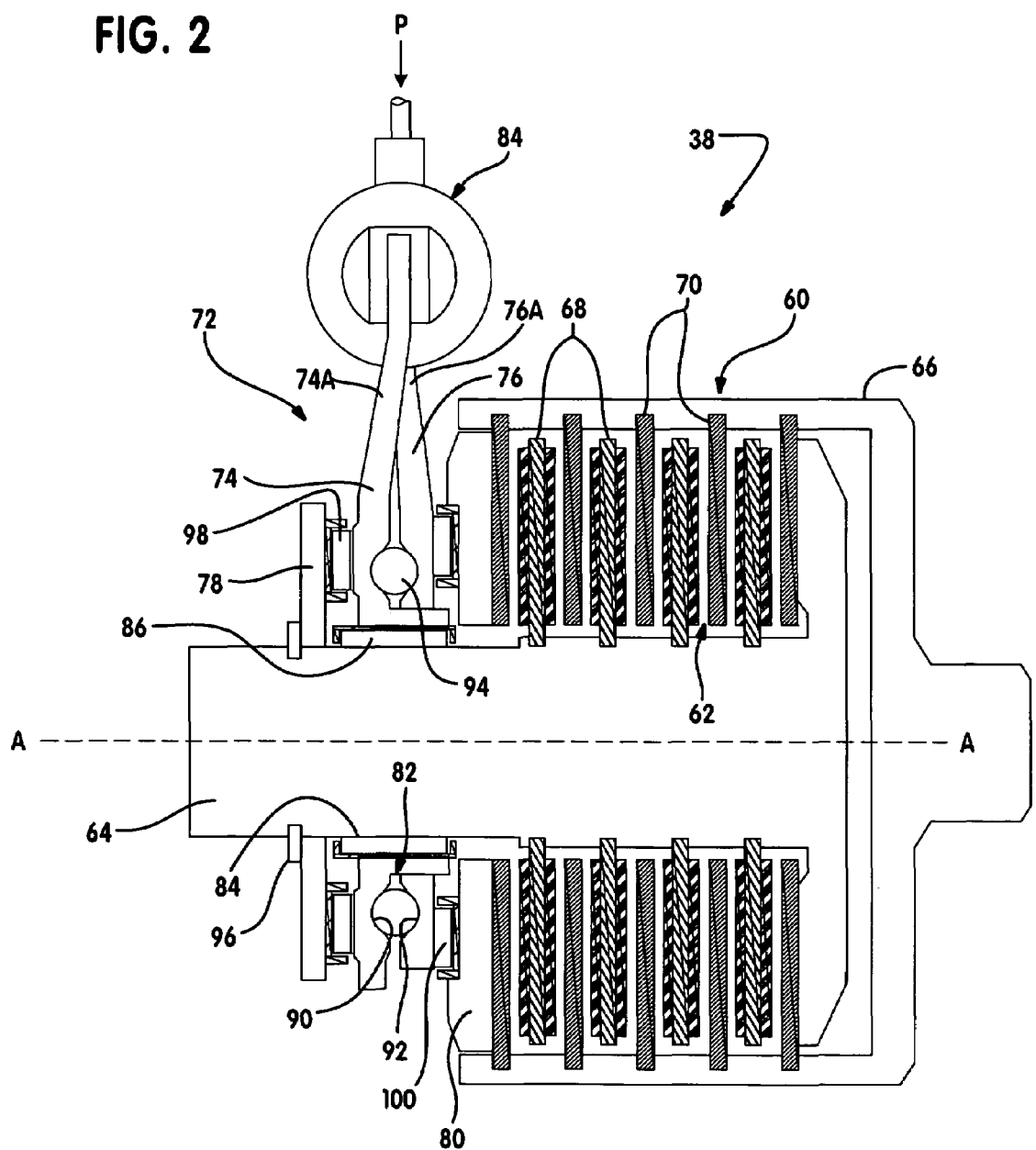
FIG. 2 is a sectional view of a torque transfer mechanism having a friction clutch assembly and a clutch actuator according to the present invention integrated in the power transfer system.
Figure 3:
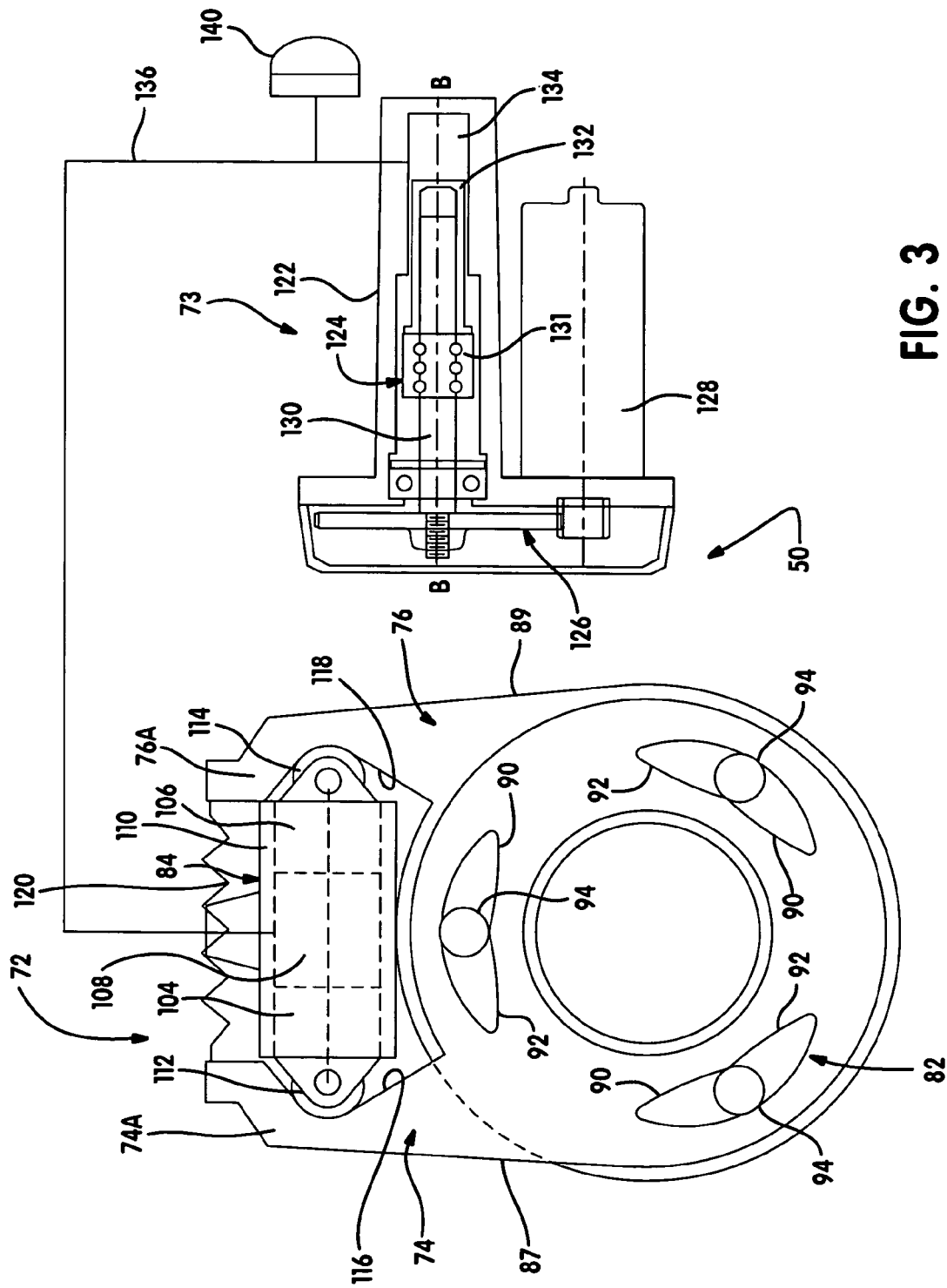
FIG. 3 is another view of the clutch actuator of the present invention.

Referring now to FIGS. 2 and 3, a cross-section of torque transfer mechanism 38 is shown. Torque transfer mechanism 38 generally includes a friction clutch assembly 60 having a multi-plate clutch pack 62. Clutch actuator 50 is operable to generate and apply a clutch engagement force on clutch pack 62 so as to regulate engagement and thus, the amount of drive torque transfer through clutch pack 62. Friction clutch assembly 60 also includes a clutch hub 64 and a drum 66. Hub 64 is adapted to be coupled for rotation with input shaft 42 while drum 66 is adapted to be coupled for rotation with pinion shaft 44. As seen, a set of first or inner clutch plates 68 associated with clutch pack 62 are fixed for rotation with hub 64. Likewise, a set of second clutch plates 70 are interleaved with first clutch plates 68 and are fixed for rotation with drum 66.

The degree of engagement of clutch pack 62, and therefore the amount of drive torque transferred therethrough, is largely based on the frictional interaction of clutch plates 68 and 70. More specifically, with friction clutch assembly 60 in a disengaged state, interleaved clutch plates 68 and 70 slip relative to one another and little or no torque is transferred through clutch pack 62. However, when friction clutch assembly 60 is in a fully engaged state, there is no relative slip between clutch plates 68 and 70 and 100% of the drive torque is transferred from input shaft 42 to pinion shaft 44. In a partially engaged state, the degree of relative slip between interleaved clutch plates 68 and 70 varies and a corresponding amount of drive torque is transferred through clutch pack 62.

In general, clutch actuator 50 includes an operator mechanism 72 and a power-operated drive mechanism 73. Operator mechanism 72 is shown to include a first actuator plate 74, a second actuator plate 76, a stop plate 78, an apply plate 80, a ballramp unit 82, and a piston assembly 84. First and second actuator plates 74 and 76 are rotatably supported on hub 64 by a bearing assembly 86 and include corresponding arm segments 74A and 76A, respectively, that extend tangentially. More specifically, arms 74A and 76A include respective edges 87 and 89 that are generally parallel to the axis A.

First and second actuator plates 74 and 76 also include first and second ballramp groove sets 90 and 92, respectively. Balls 94 are disposed between first and second actuator plates 74 and 76 and ride within ballramp groove sets 90 and 92. As best seen from FIG. 3, each set has three equally spaced grooves aligned circumferentially relative to the "A" axis. Thus, ballramp unit 82 is shown to be integrated into actuator plates 74 and 76 so as to provide a compact arrangement. Stop plate 78 is supported on hub 64 and is inhibited from axial movement by a lock ring 96. More specifically, stop plate 78 is disposed between lock ring 96 and first actuator plate 74 and is separated from first actuator plate 74 by a thrust bearing assembly 98. Apply plate 80 is disposed between clutch pack 62 and second actuator plate 76 and is separated from second actuator plate 76 by another thrust bearing assembly 100. Apply plate 80 is adapted to move axially to regulate engagement of clutch pack 62, as is explained in further detail below.

Piston assembly 84 is actuated by drive mechanism 73 to control relative rotation between first and second actuator plates 74 and 76. More specifically, piston assembly 84 includes a first piston 104 and a second piston 106 that are disposed for sliding movement within a pressure chamber 108 formed in a cylinder housing 110. As seen, first and second pistons 104 and 106 have first and second rollers 112 and 114, respectively, attached thereto. First and second rollers 112 and 114 engage corresponding first and second cam surfaces 116 and 118 formed on first and second arms 74A and 76A, respectively. First and second rollers 112 and 114 are induced to ride against first and second cam surfaces 116 and 118 in response to movement of pistons 104 and 106 caused by actuation of drive mechanism 73. Specifically, rolling movement of first and second rollers 112 and 114 against first and second cam surfaces 116 and 118 results in relative rotation between first and second actuator plates 74 and 76. Pistons 104 and 106 are shown in FIG. 3 in a first or "retracted" position within pressure chamber 108 such that first and second actuator plates 74 and 76 are located in a corresponding first angular position relative to each other. A return spring 120 is provided for normally biasing first and second actuator plates 74 and 76 toward this first angular position. With the actuator plates located in their first angular position, ballramp unit 82 functions to axially locate second actuator plate 76 in a corresponding first or "released" position whereat apply plate 80 is released from engagement with clutch pack 62. In this position, a minimum clutch engagement force is applied to clutch pack 62 such that little or no drive torque is transmitted from input shaft 42 to pinion shaft 44.

As will be detailed, drive mechanism 73 is operable to cause pistons 104 and 106 to move toward a second or "expanded" position within pressure chamber 108 such that actuator plates 74 and 76 are caused by engagement with rollers 112 and 114 to circumferentially index to a second angular position. Such rotary indexing of actuator plates 74 and 76 causes ballramp unit 82 to axially displace second actuator plate 76 from its released position toward a second or "locked" position whereat apply plate 80 is fully engaged with clutch pack 62. With second actuator plate 76 in its locked position, a maximum clutch engagement force is applied to clutch pack 62 such that pinion shaft 44 is, in effect, coupled for common rotation with input shaft 42.

Drive mechanism 73 is shown in FIG. 3 to include a piston housing 122, a ballscrew and piston assembly 124, a gearset 126, and an electric motor 128. Electric motor 128 rotatably drives gearset 126 which, in turn, rotatably drives a leadscrew 130 associated with piston assembly 124. Such rotation of leadscrew 130 results in axial movement of a nut 131 mounted thereon which, in turn, causes corresponding axial movement of a piston plunger 132 within a fluid control chamber 134 formed in housing 122. Control chamber 134 is in fluid communication with pressure chamber 108 via a closed hydraulic control system. Specifically, as piston plunger 132 translates along an axis "B", it regulates the volume of fluid in control chamber 134. As the volume of control chamber 134 decreases, fluid is supplied through a conduit 136 to pressure chamber 108 in piston assembly 84, thereby causing pistons 104 and 106 to move in concert toward their expanded position. In contrast, as the volume of control chamber 134 increases, the fluid flows back through conduit 136 from piston chamber 108 to relieve the pressure exerted by first and second rollers 112 and 114 against first and second cam surfaces 116 and 118.

Accordingly, rotation of leadscrew 130 in a first rotary direction results in axial movement of piston plunger 132 in a first direction (right in FIG. 3), thereby causing pistons 104 and 106 to be forcibly moved toward their expanded position for angularly indexing first and second actuator plates 74 and 76 toward their second angular position in opposition to the biasing force exerted thereon by return spring 120. In contrast, rotation of leadscrew 130 in a second rotary direction results in axial movement of piston plunger 132 in a second direction (left in FIG. 3), thereby permitting the biasing force of return spring 120 to forcibly rotate actuator plates 74 and 76 toward their first angular position which, in turn, causes pistons 104 and 106 to move back toward their retracted position. A pressure sensor 140 is responsive to the pressure within conduit 136 and generates a signal that is sent to ECU 56. Preferably, ECU 56 is functional to correlate line pressure readings from pressure sensor 140 to the torque output of friction clutch assembly 60.

In its neutral, clutch actuator 50 imparts no clutch engagement force on clutch pack 62 such that first and second clutch plates 68 and 70 are permitted to slip relative to one another. As first and second actuator plates 74 and 76 are caused to rotate relative to one another, balls 94 ride within ballramp grooves 90 and 92 to axially move second actuator plate 76. Since stop plate 78 inhibits axial movement of first actuator plate 74, as balls 94 ride up ballramp grooves 90 and 92, second actuator plate 76 is separated from first actuator plate 74 and moves linearly to impart the clutch engagement force on apply plate 80 through thrust bearing assembly 100. Apply plate 80, in turn, imparts this linear clutch engagement force on clutch pack 62, thereby regulating engagement of clutch pack 62.

With second actuator plate 76 in its released position, virtually no drive torque is transferred from input shaft 42 to pinion shaft 44 through friction clutch 60, thereby effectively establishing the two-wheel drive mode. In contrast, axial movement of second actuator plate 76 to its locked position causes a maximum amount of drive torque to be transferred through friction clutch 60 to pinion shaft 44 for, in effect, coupling pinion shaft 44 for common rotation with rear prop shaft 28, thereby establishing the part-time four-wheel drive mode. Accordingly, controlling the position of second actuator plate 76 between its released and locked positions permits variable control of the amount of drive torque transferred from rear prop shaft 28 to pinion shaft 44, thereby establishing the on-demand four-wheel drive mode.

Thus, the control signal supplied to electric motor 128 controls the angular position of actuator plates 74 and 76 for controlling axial movement of apply plate 80 relative to clutch pack 62.

ECU 56 sends electrical control signals to electric motor 128 for accurately controlling the position of control piston 132 within control chamber 134 by utilizing a predefined control strategy that is based on the mode signal from mode selector 54 and the sensor input signals from vehicle sensors 52. In operation, if the two-wheel drive mode is selected, motor 156 drives leadscrew 130 in its second direction for moving control piston 132 so as to reduce the fluid pressure within pressure chamber 108. As such, return spring 120 forcibly biases actuator plates 74 and 76 toward their first angular position until second actuator plate 76 is axially moved to its released position. In contrast, upon selection of the part-time four-wheel drive mode, motor 128 drives leadscrew 130 in its first rotary direction for increasing the fluid pressure in pressure chamber 108 until pistons 104 and 106 are located in their expanded position. As noted, such movement causes actuation plates 74 and 76 to rotate to their second angular position such that second actuator plate 76 is axially moved to its locked position for fully engaging friction clutch 60.

When mode selector 54 indicates selection of the on-demand four-wheel drive mode, ECU 56 energizes motor 128 for initially rotating leadscrew 130 until second actuator plate 76 is located in an intermediate or "ready" position. Accordingly, a predetermined minimum amount of drive torque is delivered to pinion shaft 44 through friction clutch 60 in this adapt-ready condition. Thereafter, ECU 56 determines when and how much drive torque needs to be transferred to pinion shaft 44 based on the current tractive conditions and/or operating characteristics of the motor vehicle, as detected by sensors 52. Sensors 52 detect such parameters as, for example, the rotary speed of the shafts, the vehicle speed and/or acceleration, the transmission gear, the on/off status of the brakes, the steering angle, the road conditions, etc. Such sensor signals are used by ECU 56 to determine a desired output torque value utilizing a control scheme that is incorporated into ECU 56. This desired torque value is used to actively control actuation of electric motor.

In addition to adaptive torque control, the present invention permits release of friction clutch 60 in the event of an ABS braking condition or during the occurrence of an over-temperature condition. Furthermore, while the control scheme was described based on an on-demand strategy, it is contemplated that a differential or "mimic" control strategy could likewise be used. Specifically, the torque distribution between prop shaft 28 and pinion shaft 44 can be controlled to maintain a predetermined rear/front ratio (i.e., 70:30, 50:50, etc.) so as to simulate the inter-axle torque splitting feature typically provided by a mechanical center differential unit. Regardless of the control strategy used, accurate control of clutch actuator 50 will result in the desired torque transfer characteristics across friction clutch 60. Furthermore, it should be understood that mode select mechanism 54 could also be arranged to permit selection of only two different drive modes, namely the on-demand 4WD mode and the part-time 4WD mode. Alternatively, mode select mechanism 54 could be eliminated such that the on-demand 4WD mode is always operating in a manner that is transparent to the vehicle operator.

Figure 4:
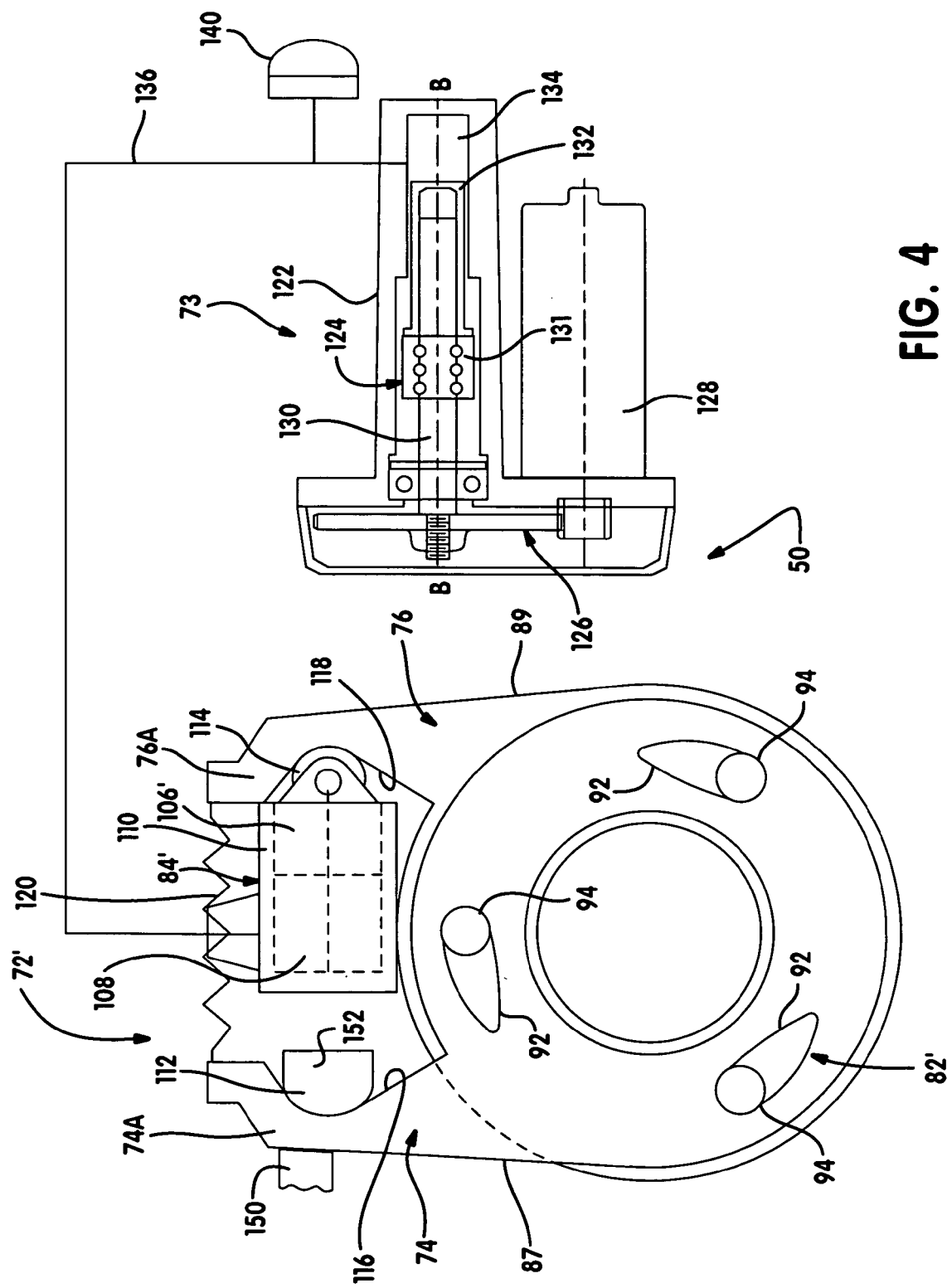
FIG. 4 illustrates an alternative version of the clutch actuator shown in FIG. 3.

Referring to FIG. 4, clutch actuator 50 is now shown to include a modified operator mechanism 72' wherein first actuator plate 74 is held against angular movement such that only second actuator plate 76 is rotated relative to first actuator plate 74. In this regard, anti-rotation members 150 and 152 are located on opposite sides of arm segment 74A so as to prevent bi-directional rotation of first actuator plate 74. In addition, grooves 90 on first actuator plate 74 have been removed to permit balls 94 to ride on a planar face cam surface on first actuator plate 74. Also, piston assembly 84' now only includes piston 106' which is still retained for sliding movement within pressure chamber 108 such that roller 114 rides against cam surface 118 on arm segment 76A of second actuator plate 76. As before, drive mechanism 73 functions to control the position of piston 106' so as to control the rotated position of second actuator plate 76 relative to first actuator plate 74. In particular, piston 106' is moveable between retracted and expanded positions to cause corresponding angular movement of second actuator plate between its first and second angular positions. When second actuator plate 76 is in its first angular position, ballramp unit 82' causes second actuator plate 76 to also be axially located in its released position. In contrast, rotation of second actuator plate 76 to its second angular position causes ballramp unit 82' to axially move second actuation plate 76 to its locked position.

It is contemplated that alternative drive mechanisms can be used in place of the closed-circuit hydraulic system disclosed. For example, a motor-driven leadscrew could be implemented to drive one or both of first and second pistons 104 and 106 of operator mechanism 72 between their retracted and expanded positions. Likewise, it is to be understood that the particular drivetrain application shown is merely exemplary of but one application to which the clutch actuator of the present invention is well suited.

Figure 5:
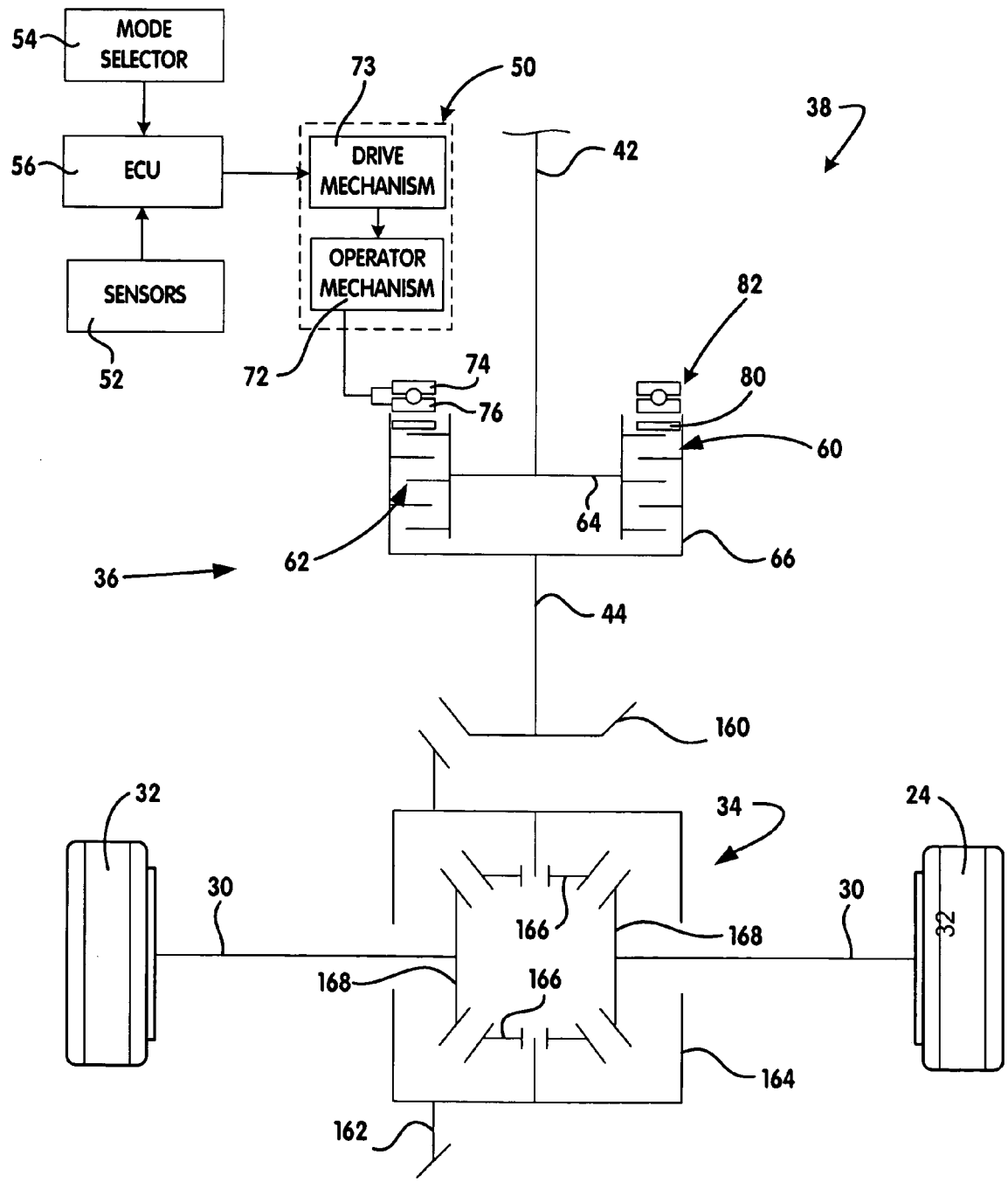
FIG. 5 is a schematic illustration of the torque transfer mechanism of the present invention arranged to provide drive torque to an axle assembly of a motor vehicle.
Figure 6:
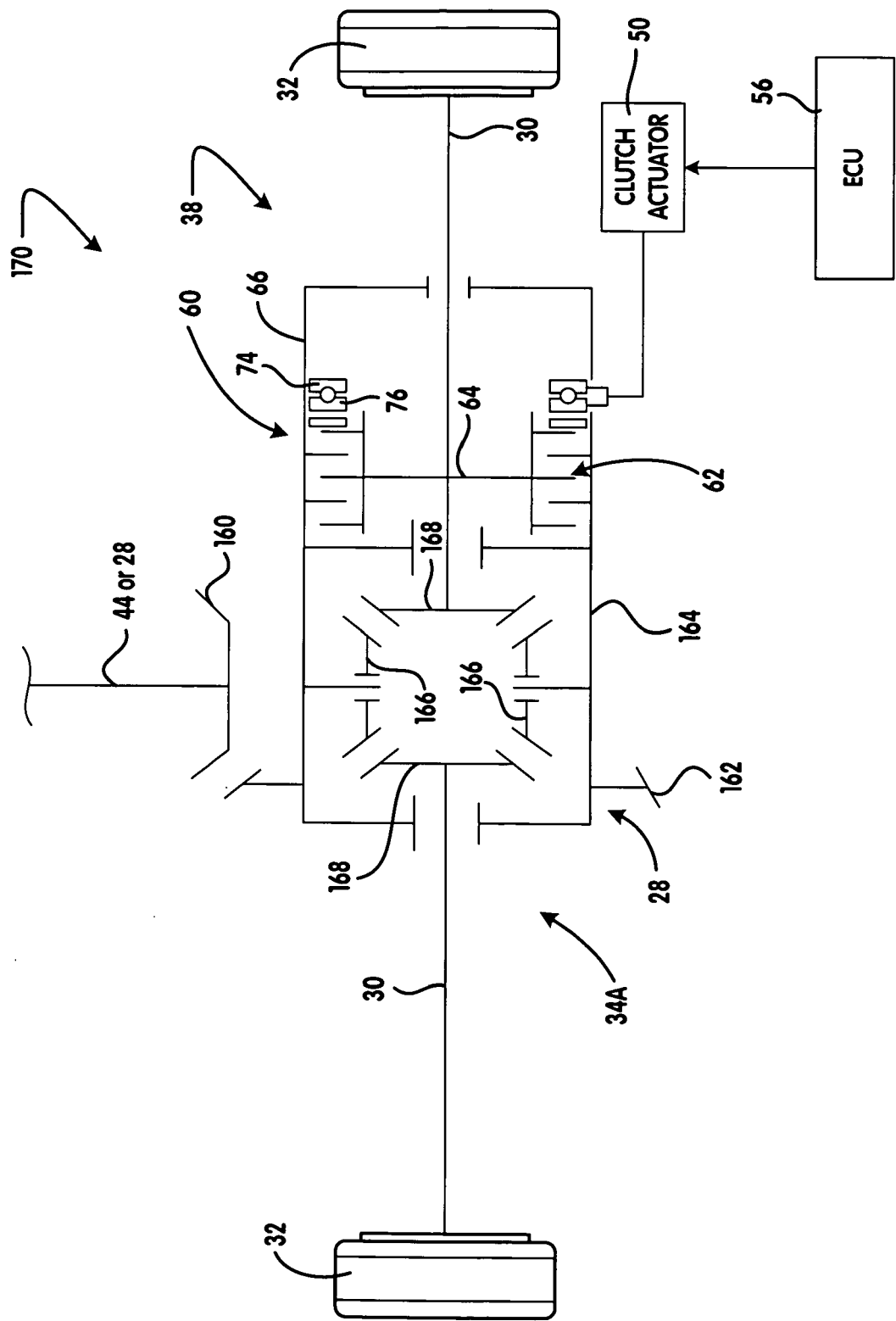
FIG. 6 is a schematic illustration of the torque transfer mechanism of the present invention arranged as a slip limiting and torque biasing differential in an axle assembly.

FIG. 5 is provided to show incorporation of friction clutch 60 and clutch actuator 50 associated with torque transfer mechanism 38 in power transfer device 36. As seen, pinion shaft 44 drives a pinion 160 that is meshed with a ring gear 162 fixed to a carrier 164 of differential unit 34. Carrier 164 rotatably supports and drives a pair of pinion gears 166 that each mesh with a pair of side gears 168. Each side gear 168 is fixed for rotation with a corresponding one of axleshafts 30. The arrangement shown for the drive axle assembly of FIG. 5 is operable to provide on-demand four-wheel drive by adaptively controlling the transfer of drive torque from the primary driveline to the secondary driveline. In contrast, a drive axle assembly 170 is shown in FIG. 6 wherein a torque transfer mechanism, hereinafter referred to as torque coupling 38A, is now operably installed between differential case 164 and one of axleshafts 30 to provide an adaptive "side-to-side" torque biasing and slip limiting feature. Torque coupling 38A is schematically shown to again include friction clutch 60 and clutch actuator 50, the construction and function of which are understood to be similar to the detailed description previously provided herein for each sub-assembly. As see, drum 66 is shown to be driven by carrier 164 while hub 64 is driven by one of axleshafts 30.

Figure 7:
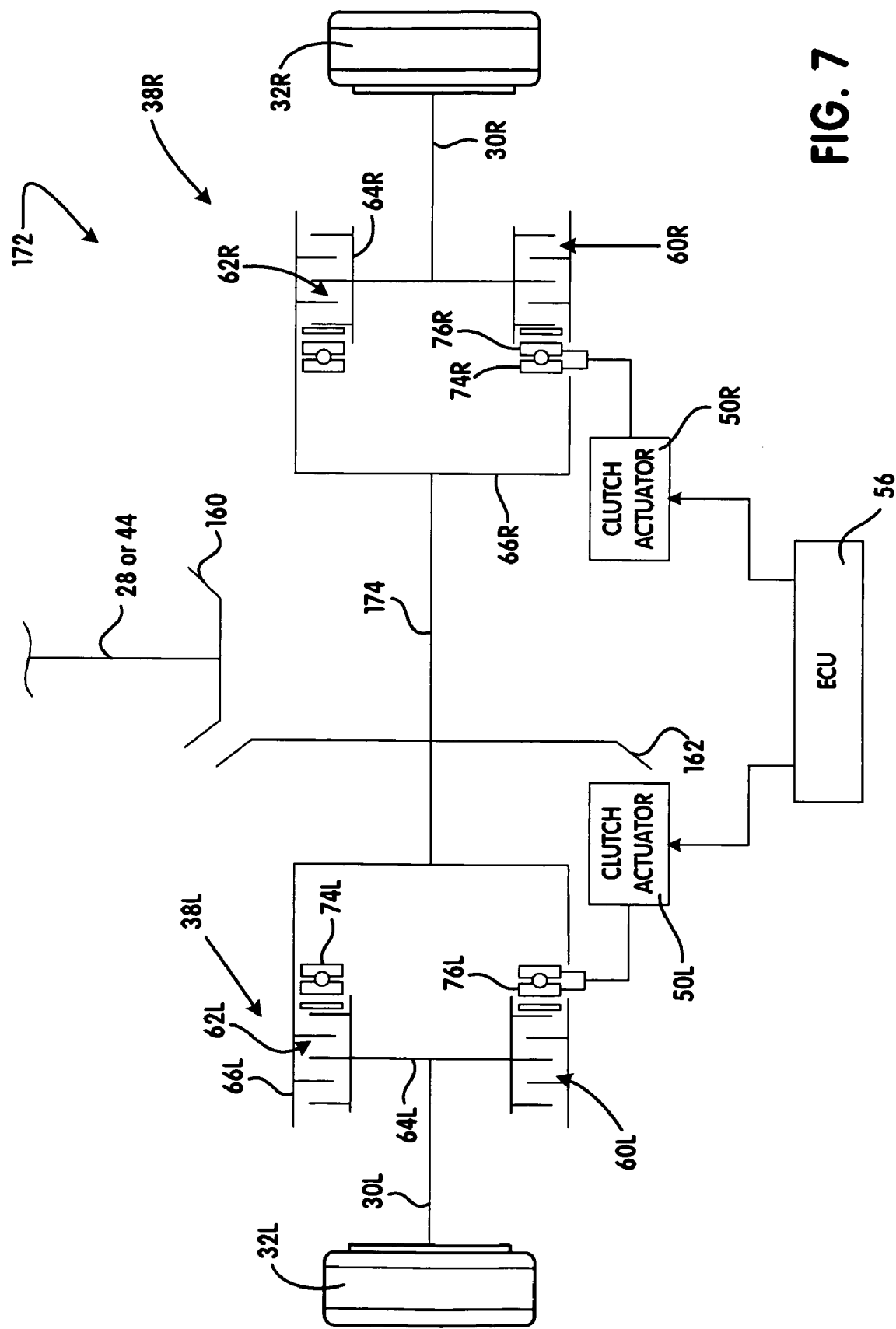
FIG. 7 is a schematic illustration of a pair of torque transfer mechanisms arranged as a torque vectoring axle assembly for a motor vehicle.

Referring now to FIG. 7, the power transfer device is shown as having a pair of torque couplings 38L and 38R that are operably installed between propshaft 28 or pinion shaft 44 and axleshafts 30. The driven shaft drives a right-angled gearset including pinion 160 and ring gear 162 which, in turn, drives a transfer shaft 174. First torque coupling 38L is shown disposed between transfer shaft 174 and the left one of axleshafts 30L while second torque coupling 38R is disposed between transfer shaft 174 and the right axleshaft 30R. Each torque coupling includes a corresponding friction clutch 60L and 60R and clutch actuator 50L and 50R. Accordingly, independent torque transfer and slip control is provided between the driven shaft and each of rear wheels 32L and 32R pursuant to this arrangement.

Figure 8:
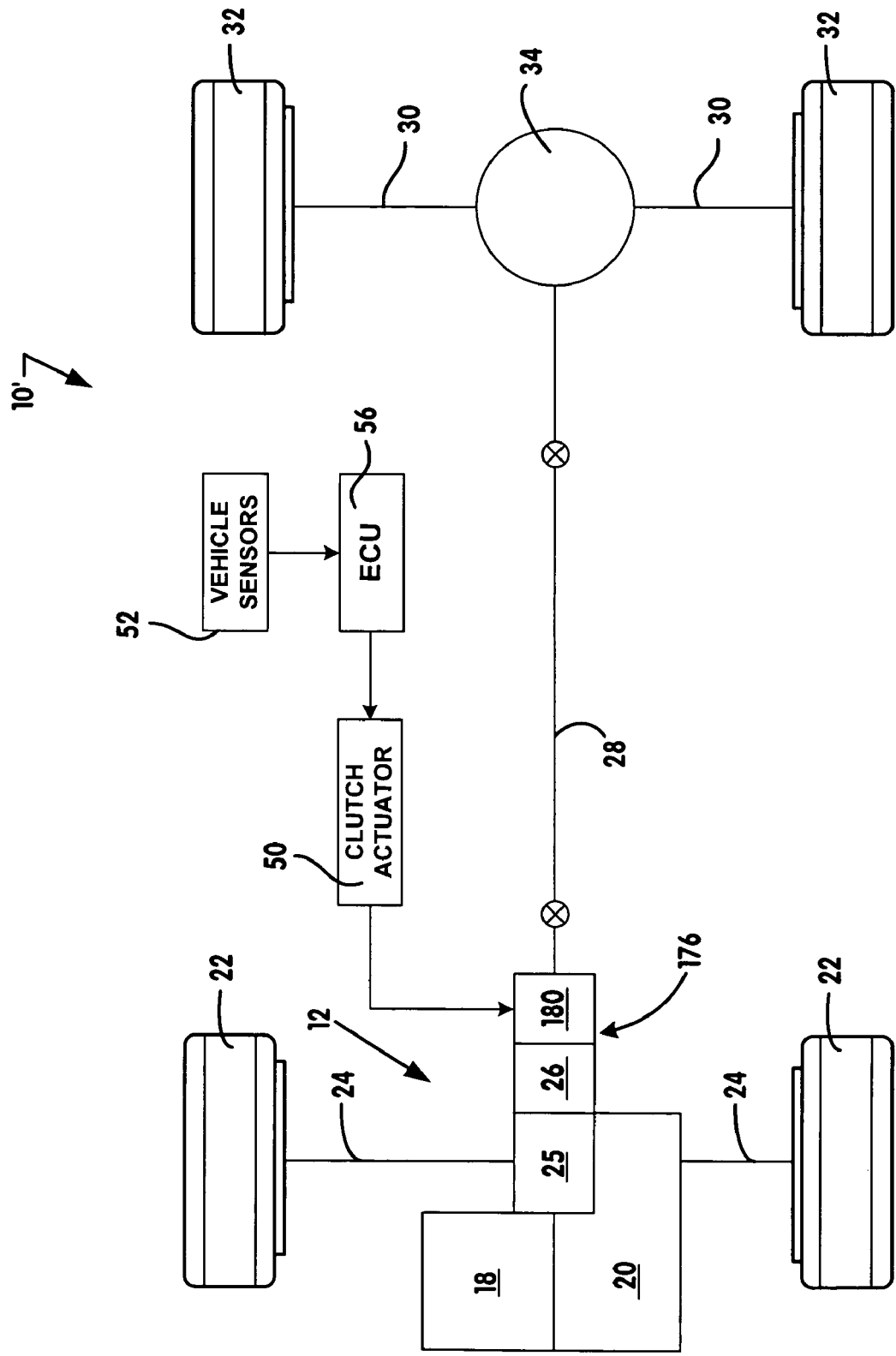
FIG. 8 illustrates another exemplary drivetrain equipped with a power transfer device to which the torque transfer mechanism of the present invention is applicable.

To illustrate additional alternative power transfer systems to which the present invention is applicable, FIG. 8 schematically depicts a front-wheel based four-wheel drive drivetrain layout 10' for a motor vehicle. In particular, engine 18 drives multi-speed transaxle 20 which has front differential unit 25 for driving front wheels 22 via first axleshafts 24. As before, PTU 26 is driven by transaxle 20. However, in this arrangement, a power transfer device 176 functions to transfer drive torque to propshaft 28. Power transfer device 176 includes a torque coupling 180 having an output member coupled to propshaft 28 which, in turn, drives rear wheels 32 via rear axleshafts 34. The rear axle assembly can be a traditional driven axle with a differential or, in the alternative, be similar to the drive axle arrangements described in regard to FIGS. 6 or 7. Accordingly, in response to detection of certain vehicle characteristics by sensors 52 (i.e., the occurrence of a front wheel slip condition), the power transfer system causes torque coupling 180 to deliver drive torque "on-demand" to rear wheels 32. It is contemplated that torque coupling 180 would be generally similar in structure and function to that of torque transfer coupling 38 previously described herein Referring now to FIG. 9, torque coupling 180 is schematically illustrated in association with an on-demand four-wheel drive system based on a front-wheel drive vehicle similar to that shown in FIG. 8. In particular, an output shaft 182 of transaxle 20 is shown to drive an output gear 184 which, in turn, drives an input gear 186 that is fixed to a carrier 188 associated with front differential unit 25. To provide drive torque to front wheels 22, front differential unit 25 includes a pair of side gears 190 that are connected to front wheels 22 via axleshafts 24. Differential unit 25 also includes pinions 192 that are rotatably supported on pinion shafts fixed to carrier 188 and which are meshed with side gears 190. A transfer shaft 194 is provided for transferring drive torque from carrier 188 to a clutch hub 64 associated with friction clutch 60. PTU 26 is a right-angled drive mechanism including a ring gear 196 fixed for rotation with drum 66 of friction clutch 60 and which is meshed with a pinion gear 198 fixed for rotation with propshaft 28. According to the present invention, the components schematically shown for torque transfer coupling 180 are understood to be similar to those previously described. In particular, clutch actuator 50 includes a power-operated drive mechanism 73 that controls operation of an operator mechanism 72 or 72' to adaptively control the clutch engagement force applied to clutch pack 62. As such, drive torque is adaptively transferred on-demand from the primary (i.e., front) driveline to the secondary (i.e., rear) driveline.

Figure 9:
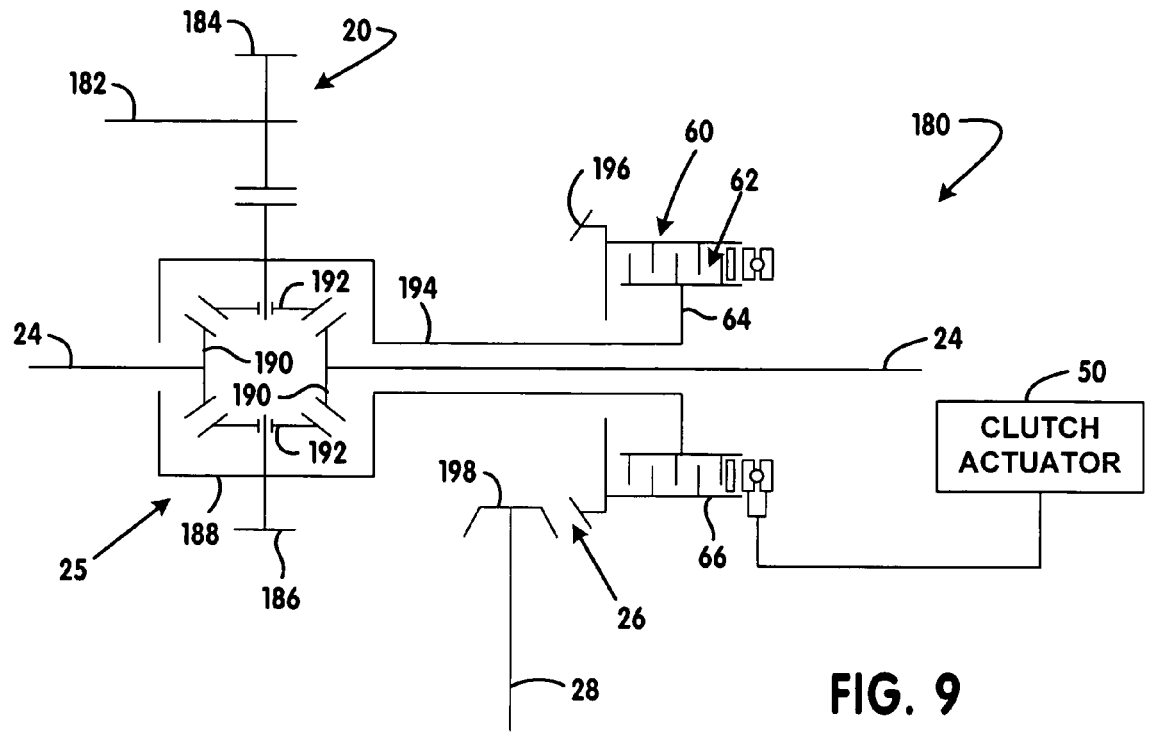
FIGS. 9 through 12 are schematic illustrations of various power transfer devices adapted for use with the drivetrain of FIG. 8.
Figure 10:
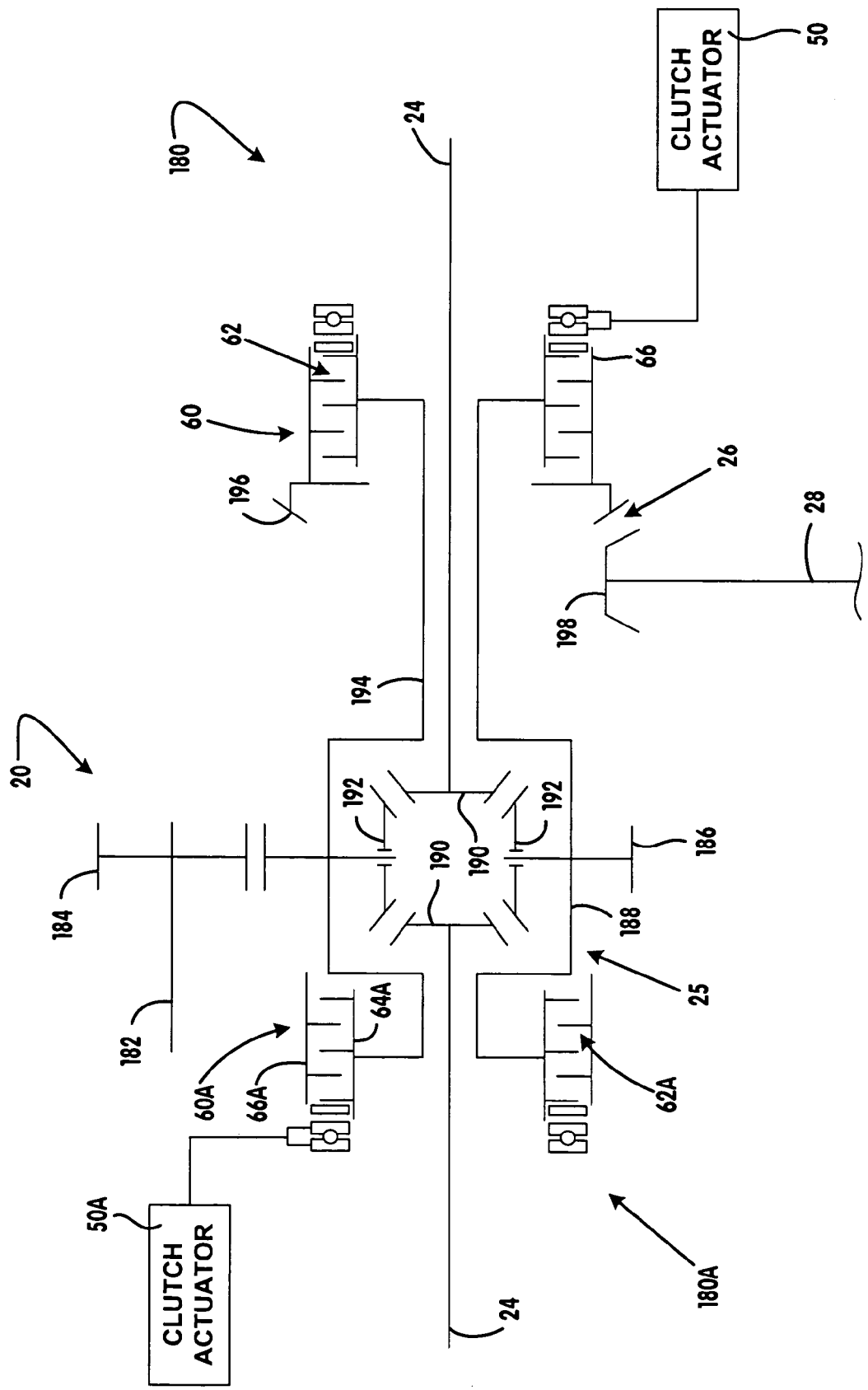

Referring to FIG. 10, a modified version of the power transfer device shown in FIG. 9 is now shown to include a second torque coupling 180A that is arranged to provide a limited slip feature in association with primary differential 25. As before, adaptive control of torque coupling 180 provides on-demand transfer of drive torque from the primary driveline to the secondary driveline. In addition, adaptive control of second torque coupling 180 provides adaptive torque biasing (side-to-side) between axleshafts 24 of primary driveline 14. As seen, components of torque coupling 180A that are common to those of torque coupling 180 are identified with an "A" suffix.

Figure 11:
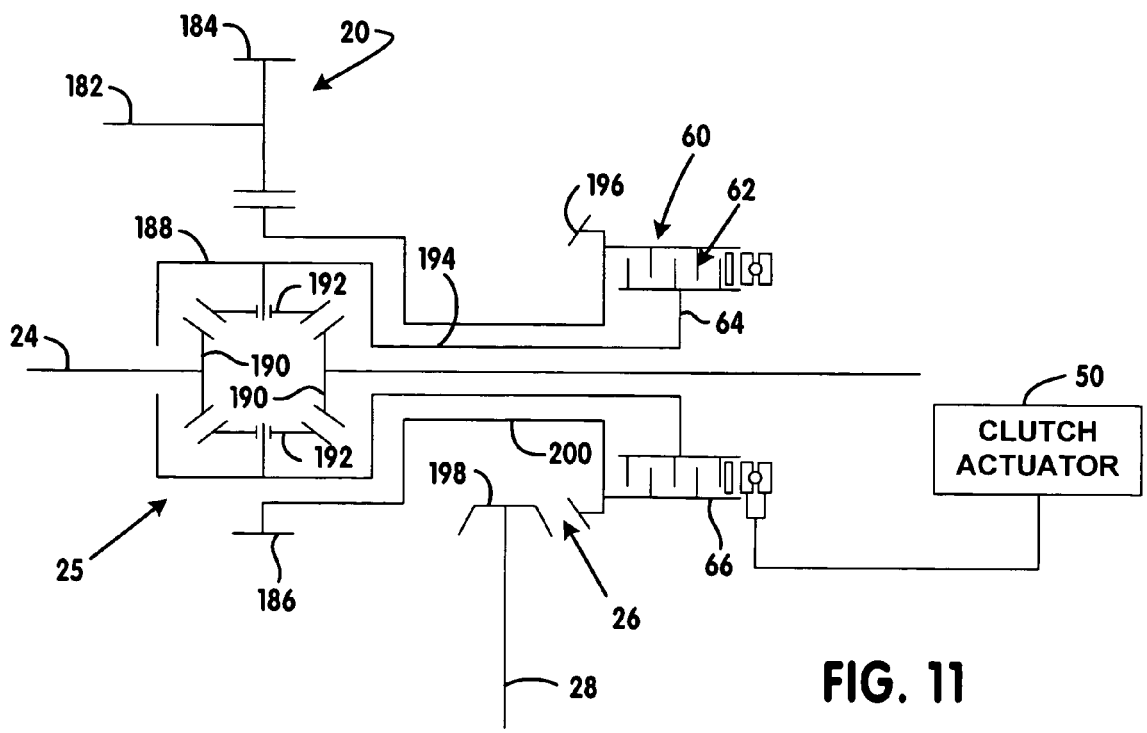

FIG. 11 illustrates another modified version of FIG. 9 wherein an on-demand four-wheel drive system is shown based on a rear-wheel drive motor vehicle that is arranged to normally deliver drive torque to rear wheels 32 while selectively transmitting drive torque to front wheels 22 through torque coupling 180. In this arrangement, drive torque is transmitted directly from transmission output shaft 182 to power transfer unit 26 via a drive shaft 200 which interconnects input gear 186 to ring gear 196. To provide drive torque to front wheels 22, torque coupling 180 is shown operably disposed between drive shaft 200 and transfer shaft 194. In particular, friction clutch 60 is arranged such that drum 66 is driven with ring gear 196 by drive shaft 200. As such, clutch actuator 50 functions to transfer drive torque from drum 66 through clutch pack 62 to hub 64 which, in turn, drives carrier 188 of differential unit 25 via transfer shaft 194.

Figure 12:
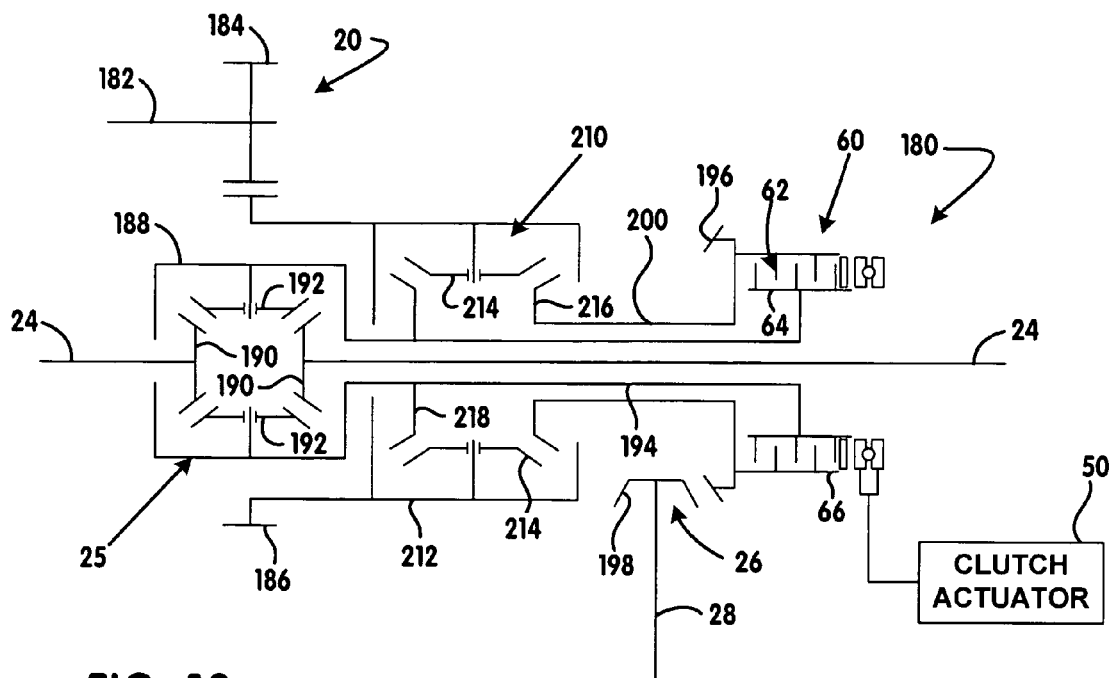

In addition to the on-demand four-wheel drive systems shown previously, the power transmission technology of the present invention can likewise be used in full-time four-wheel drive systems to adaptively bias the torque distribution transmitted by a center or "interaxle" differential unit to the front and rear drivelines. For example, FIG. 12 schematically illustrates a full-time four-wheel drive system which is generally similar to the on-demand four-wheel drive system shown in FIG. 11 with the exception that an interaxle differential unit 210 is now operably installed between carrier 188 of front differential unit 25 and transfer shaft 194. In particular, output gear 186 is fixed for rotation with a carrier 212 of interaxle differential 210 from which pinion gears 214 are rotatably supported. A first side gear 216 is meshed with pinion gears 214 and is fixed for rotation with drive shaft 200 so as to be drivingly interconnected to the rear driveline through power transfer unit 26. Likewise, a second side gear 218 is meshed with pinion gears 214 and is fixed for rotation with carrier 188 of front differential unit 25 so as to be drivingly interconnected to the front driveline. Torque coupling 180 is now shown to be operably disposed between side gears 216 and 218. Torque coupling 180 is operably arranged between the driven outputs of interaxle differential 210 for providing an adaptive torque biasing and slip limiting function between the front and rear drivelines.

Figure 14:
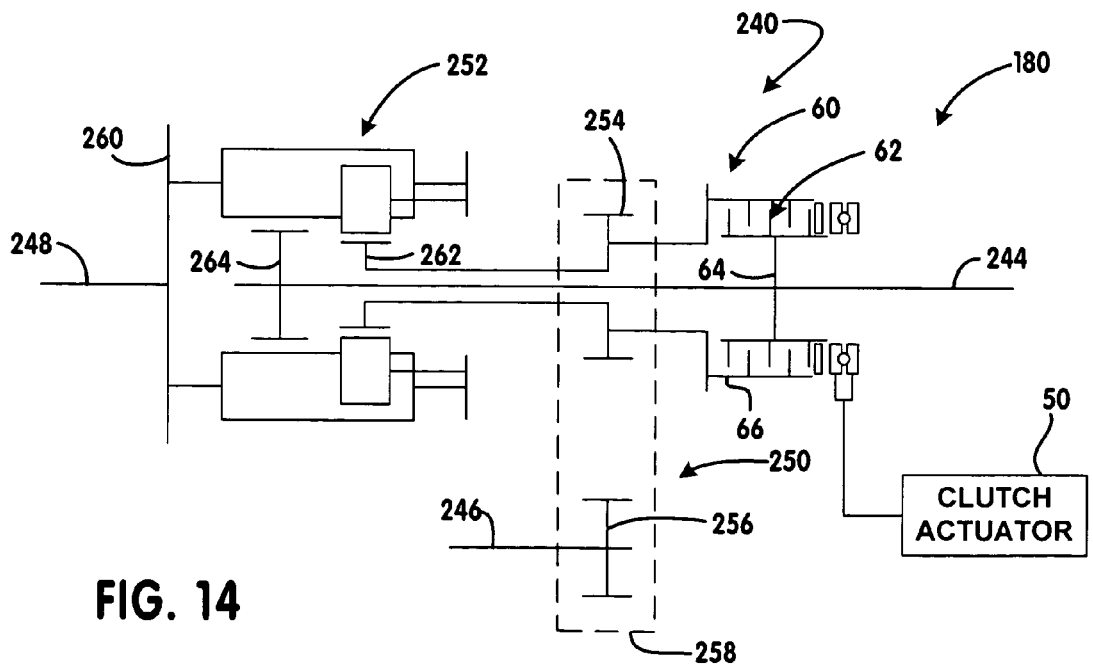
FIGS. 14 and 15 illustrate transfer cases equipped with the torque transfer mechanisms of the present invention and which are adapted for use with the drivetrain of FIG. 13.
Figure 13:
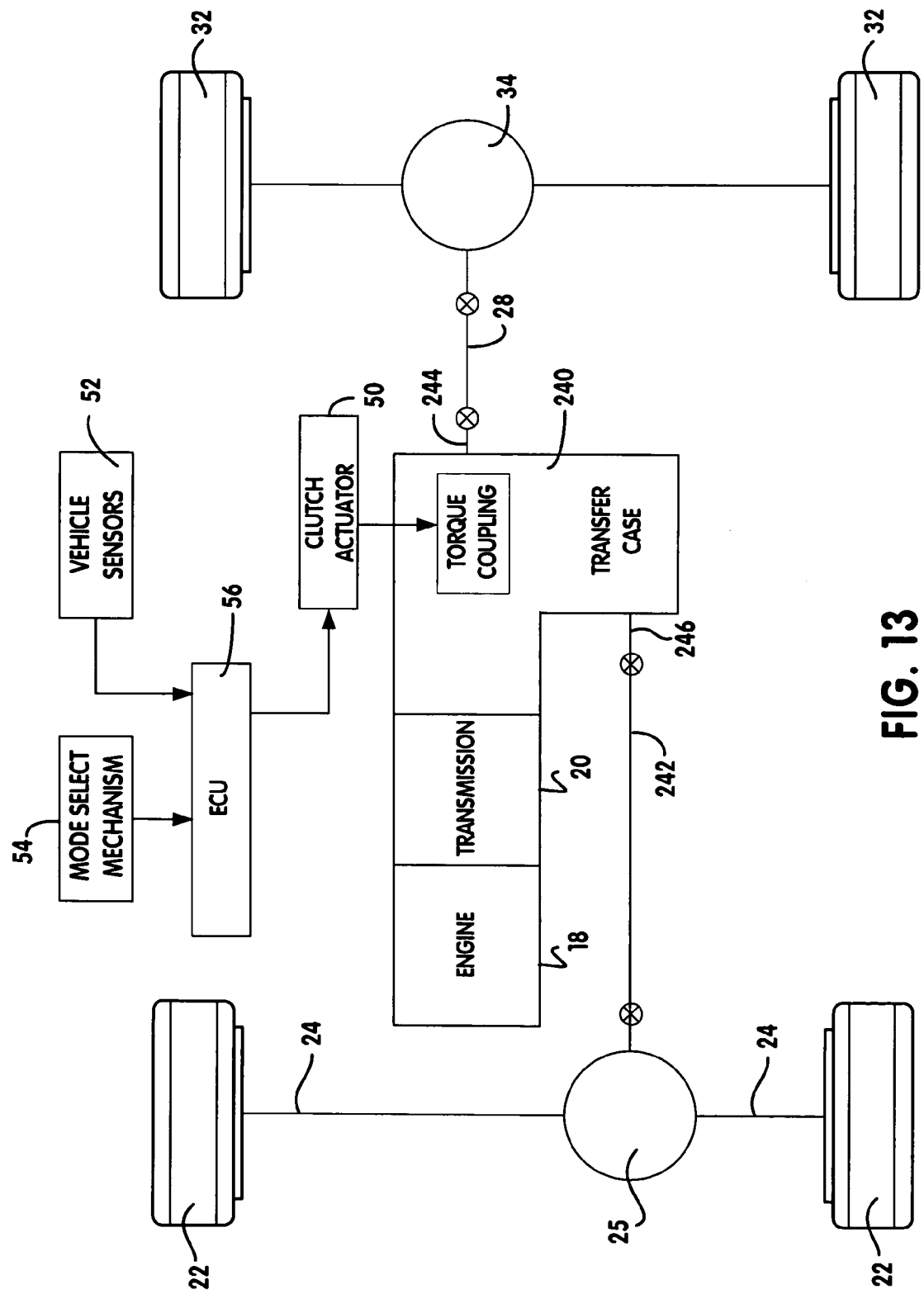
FIG. 13 illustrates yet another exemplary drivetrain for a four-wheel drive vehicle.
Figure 15:
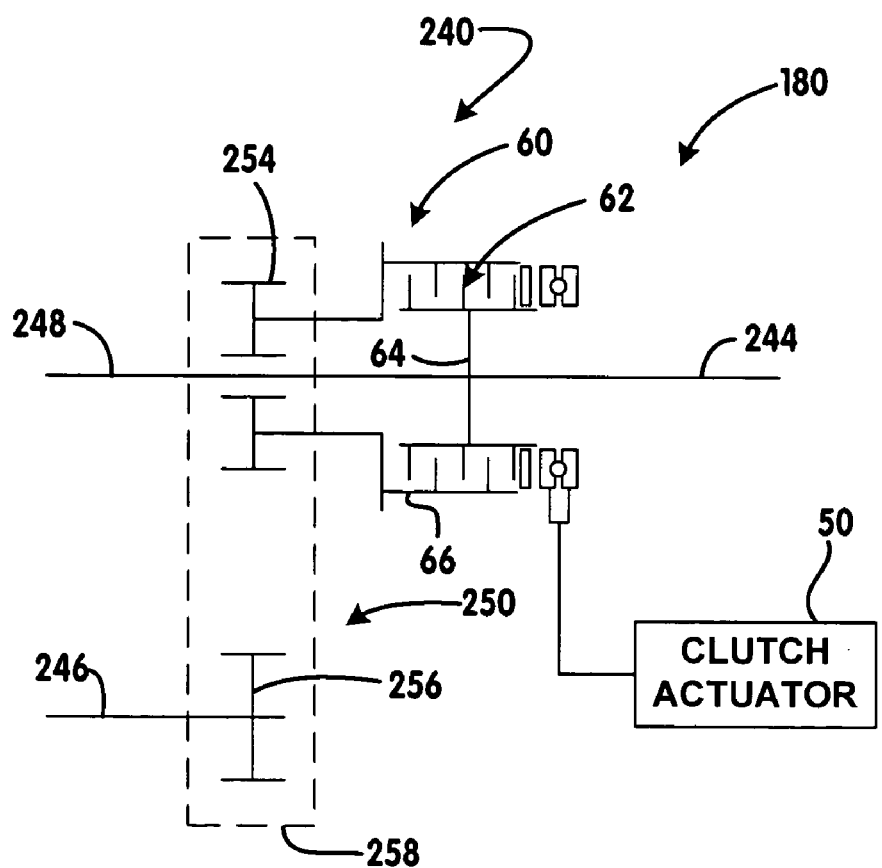

Referring now to FIG. 13, a drivetrain layout for a four-wheel drive vehicle is shown to include a power transfer device, hereinafter referred to as a transfer case 240, arranged to transfer drive torque from engine 18 and transmission 20 to rear propshaft 28 and a front propshaft 242 that is arranged to drive front wheels 22 in via front differential 25 and axleshafts 24. Transfer case 240 is shown to include a rear output shaft 244 coupled to rear propshaft 28 and a front output shaft 246 coupled to front propshaft 242. From FIG. 14, transfer case 240 is further shown to include an input shaft 248 driven by transmission 20, a transfer unit 250 driving front output shaft 246, and a differential 252 interconnecting input shaft 248 to transfer unit 250 and rear output shaft 244. Transfer unit 250 includes a first sprocket 254 rotatably supported on rear output shaft 244, a second sprocket 256 fixed to front output shaft 246 and a power chain 258 therebetween. Differential 252 includes an input 260 driven by input shaft 248, a front output 262 driving first sprocket 254, a second output 264 driving rear output shaft 244, and a speed differentiating gearset therebetween. As seen, torque coupling 180 is operably disposed between transfer unit 250 and rear output shaft 244 to control adaptive torque biasing therebetween. FIG. 15 illustrates a modified version of transfer case 240 wherein differential 252 is removed such that input shaft 248 is directly coupled to rear output shaft 244 with friction clutch 60 arranged to permit on-demand transfer of drive torque from rear output shaft 244 to front output shaft 246.

Various preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transfer device for use in a motor vehicle having a powertrain and first and second drivelines, comprising:
a rotary input driven by the powertrain;
a first rotary output driven by said input and coupled to the first driveline;
a second rotary output coupled to the second driveline;
a friction clutch operably disposed between said first and second rotary outputs;
a clutch actuator for applying a clutch engagement force to said friction clutch, said clutch actuator including an operator mechanism having first actuator plate rotatable about an axis and having a set of first grooves and a first arm segment with a first cam surface formed thereon, a second actuator plate rotatable about said axis for angular movement relative to said first actuator plate and having a set of second grooves, balls disposed in aligned pairs of said first and second grooves, and a piston assembly including a follower engaging said first cam surface such that movement of said piston assembly between first and second positions causes corresponding relative angular movement of said first and second actuator plates between first and second angular positions so as to cause corresponding axial movement of said second actuator plate relative to said friction clutch; and
a power-operated drive mechanism for controlling movement of said piston assembly.

2. The power transfer device of claim 1 wherein said second actuator plate is located in a first axial position relative to said first actuator plate when said first and second actuator plates are rotated to their first angular position so as to apply a minimum clutch engagement force on said friction clutch, and wherein said second actuator plate is located in a second axial position relative to said first actuator plate when said first and second actuator plates are rotated to their second angular position so as to apply a maximum clutch engagement force on said friction clutch.

3. The power transfer device of claim 2 wherein said second actuator plate includes a second arm segment having a second cam surface formed thereon, wherein said piston assembly includes a first piston having a first roller secured thereto and a second piston having a second roller secured thereto in engagement with said second cam surface, and wherein said drive mechanism is operable for causing coordinated movement of said first and second pistons.

4. The power transfer device of claim 3 wherein said first and second pistons are in a retracted position relative to each other to define said first position of said piston assembly, and wherein said first and second pistons are in an expanded position relative to each other to define said second position of said piston assembly.

5. The power transfer device of claim 4 wherein said first and second pistons are disposed for sliding movement in a pressure chamber, and wherein said drive mechanism is operable for controlling the fluid pressure in said pressure chamber so as to control movement of said first and second pistons between their retracted and expanded positions.

6. The power transfer device of claim 5 wherein said drive mechanism includes a control piston retained in a control chamber that is in fluid communication with said pressure chamber, and an electric motor for controlling sliding movement of said control piston with said control chamber.

7. The power transfer device of claim 1 further comprising a differential having an input component driven by said rotary input, a first output component driving said first rotary output, a second output component driving said second rotary output, and a gearset for transmitting drive torque from said input component to said first and second output components with permitting speed differentiation therebetween.

8. The power transfer device of claim 1 defining a transfer case with said rotary input including an input shaft, said first rotary output including a first output shaft and said second rotary output including a second output shaft, said transfer case further including a transfer unit driving said second output shaft such that said friction clutch is operably disposed between said transfer unit and said first output shaft.

9. A power transfer device for use in a motor vehicle having a powertrain and first and second drivelines, comprising:
a rotary input driven by the powertrain;
a first rotary output driven by said input and coupled to the first driveline;
a second rotary output coupled to the second driveline;
a friction clutch operably disposed between said first and second outputs;
a clutch actuator for applying a clutch engagement force to said friction clutch, said clutch actuator including a first actuator plate rotatable about an axis and having a set of first grooves, a second actuator plate rotatable about said axis for angular movement relative to said first actuator plate and having a set of second grooves, balls disposed in aligned pairs of said first and second grooves, a piston assembly operable for rotating at least one of said first and second actuator plates relative to the other actuator plate so as to cause axial movement of said second actuator plate relative to said friction clutch, and a power-operated drive mechanism for moving said piston assembly, wherein said piston assembly includes a first and second piston disposed in a common pressure chamber, said first piston engaging a first cam surface on said first actuator plate, said second piston engaging a second cam surface on said second actuator plate, and wherein said drive mechanism includes a control piston disposed in a control chamber that is in fluid communication with said pressure chamber, a leadscrew unit for causing axial movement of said control piston in said control chamber, and an electric motor operable to driving said leadscrew unit.

10. A transfer unit for use in a four-wheel drive vehicle having a powertrain and first and second drivelines, comprising:
an input shaft driven by the powertrain;
a first output shaft driven by said input shaft and coupled to the first driveline;
a second output shaft coupled to the second driveline;
a friction clutch operably disposed between said first and second output shafts;
a clutch actuator for applying a clutch engagement force to said friction clutch, said clutch actuator including an operator mechanism having first actuator plate rotatable about an axis and having a set of first grooves and a first arm segment having a first cam surface thereon, a second actuator plate rotatable about said axis for angular movement relative to said first actuator plate and having a set of second grooves, balls disposed in aligned pairs of said first and second grooves, and an apply piston assembly disposed in a pressure chamber and having a first follower engaging said first cam surface such that movement of said piston assembly between first and second positions causes corresponding relative angular movement of said first and second actuator plates between first and second angular positions so as to cause corresponding axial movement of said second actuator plate relative to said friction clutch; and a power-operated drive mechanism for controlling movement of said piston assembly, said drive mechanism including a control piston supported for movement in a control chamber which is in fluid communication with said pressure chamber, a leadscrew unit having a first component engaging said control piston and a second component, and an electric motor for rotatably driving said second component so as to cause corresponding movement of said control piston with said first component.

11. The transfer unit of claim 10 wherein said second actuator plate is located in a first axial position relative to said first actuator plate when said first and second actuator plates are rotated to their first angular position so as to apply a minimum clutch engagement force on said friction clutch, and wherein said second actuator plate is located in a second axial position relative to said first actuator plate when said first and second actuator plates are rotated to their second angular position so as to apply a maximum clutch engagement force on said friction clutch.

12. The transfer unit of claim 11 wherein said second actuator plate includes a second arm segment having a second cam surface formed thereon, wherein said piston assembly includes a first piston having a first roller secured thereto and a second piston having a second roller secured thereto in engagement with said second cam surface, and wherein said drive mechanism is operable for causing coordinated movement of said first and second pistons.

13. The transfer unit of claim 12 wherein said first and second pistons are in a retracted position relative to each other to define said first position of said piston assembly, and wherein said first and second pistons are in an expanded position relative to each other to define said second position of said piston assembly, wherein said first and second pistons are disposed for sliding movement in said pressure chamber, and wherein said drive mechanism is operable for controlling the fluid pressure in said pressure chamber so as to control movement of said first and second pistons between their retracted and expanded positions.

14. The transfer unit of claim 10 wherein said piston assembly includes first and second pistons disposed in said pressure chamber, said first piston having a first roller engaging a first cam surface on said first actuator plate, said second piston having a second roller engaging a second cam surface on said second actuator plate, and wherein said control piston is fixed to a nut associated with said leadscrew unit and which is supported on a rotary screw, said motor operable for rotating said screw to control axial movement of said nut relative to said screw.

15. A power transfer device for use in a motor vehicle having a powertrain and first and second drivelines, comprising:

a rotary input driven by the powertrain;
a first rotary output driven by said input and coupled to the first driveline;
a second rotary output coupled to the second driveline;
a friction clutch operably disposed between said first and second rotary outputs;
a clutch actuator for applying a clutch engagement force to said friction clutch, said clutch actuator including an operator mechanism having first actuator plate rotatable about an axis and having a set of first grooves, a second actuator plate rotatable about said axis for angular movement relative to said first actuator plate and having a set of second grooves, balls disposed in aligned pairs of said first and second grooves, and a piston assembly operable for rotating both of said first and second actuator plates relative to the other thereof so as to cause corresponding axial movement of said second actuator plate relative to said friction clutch, said piston assembly includes first and second pistons disposed in a common pressure chamber, said first piston having a first roller engaging a first cam surface on said first actuator plate and said second piston having a second roller engaging a second cam surface on said second actuator plate; and
a power-operated drive mechanism for controlling movement of said piston assembly, said drive mechanism includes a control piston disposed in a control chamber that is in fluid communication with said pressure chamber, a leadscrew unit for causing axial movement of said control piston in said control chamber, and an electric motor operable for driving said leadscrew unit.

16. The power transfer device of claim 15 wherein said first and second pistons are in a retracted position relative to each other to define a first position of said piston assembly, and wherein said first and second pistons are in an expanded position relative to each other to define a second position of said piston assembly, and wherein said drive mechanism is operable for controlling the fluid pressure in said pressure chamber so as to control movement of said first and second pistons between their retracted and expanded positions.

17. The power transfer device of claim 15 further comprising a differential having an input component driven by said rotary input, a first output component driving said first rotary output, a second output component driving said second rotary output, and a gearset for transmitting drive torque from said input component to said first and second output components with permitting speed differentiation therebetween.

18. The power transfer device of claim 15 defining a transfer case with said rotary input including an input shaft, said first rotary output including a first output shaft and said second rotary output including a second output shaft, said transfer case further including a transfer unit driving said second output shaft such that said friction clutch is operably disposed between said transfer unit and said first output shaft.

19. A power transfer unit for use in a motor vehicle having a powertrain and first and second drivelines, comprising:

a rotary input driven by the powertrain;
a first rotary output driven by said input and coupled to the first driveline;
a second rotary output coupled to the second driveline;
a friction clutch operably disposed between said first and second outputs;
a clutch actuator operable to adaptively regulate engagement of said friction clutch and including an operator mechanism and a drive mechanism, said operator mechanism including first and second actuator plates rotatably supported on said first output, a cam arrangement operable for causing axial movement of said second actuator plate relative to said friction clutch in response to relative rotation between said first and second actuator plates, and a linear operator engaging a cam surface formed on an arm segment extending from one of said first and second actuator plates, said drive mechanism including a power-operated device operable for controlling movement of said linear operator for causing relative rotation between said first and second actuator plates; and a control system for controlling actuation of said power-operated device.

20. The power transfer unit of claim 19 wherein said linear operator includes a piston disposed for movement in a pressure chamber and engaging said cam surface on said arm segment, and wherein said power-operated device is operable for controlling the fluid pressure in said pressure chamber for controlling movement of said piston between first and second positions.

21. The power transfer unit of claim 20 wherein said piston is operable in its first position to rotate at least one of said first and second actuator plates such that said cam arrangement locates said second actuator plate in a first axial position for causing a first clutch engagement force to be exerted on said friction clutch, and wherein said piston is operable in its second position to rotate at least one of said first and second actuator plates such that said cam arrangement locates said second actuator plate in a second axial position for causing a second clutch engagement force to be exerted on said friction clutch.

22. The power transfer unit of claim 20 wherein said piston engages said cam surface formed on said arm segment of said first actuator plate, wherein said linear operator further includes a second piston disposed for movement in said pressure chamber and engaging a second cam surface formed on a second arm segment extending from said second actuator plate such that both of said first and second actuator plates are rotatable.

23. The power transfer unit of claim 20 wherein said power-operated device includes a motor-driven fluid pump in fluid communication with said pressure chamber.

24. The power transfer unit of claim 20 wherein said power-operated device includes an electric motor having a motor output operable for moving a control piston disposed in a control chamber and a fluid delivery system providing fluid communication between said control chamber and said pressure chamber.

25. A power transfer unit for use in a motor vehicle having a powertrain and first and second drivelines, comprising:
a rotary input driven by the powertrain;
a first rotary output driven by said input and coupled to the first driveline;
a second rotary output coupled to the second driveline;
a friction clutch operably disposed between said first and second outputs; and
a clutch actuator for applying a clutch engagement force on said friction clutch and having an operator mechanism and a drive mechanism, said operator mechanism including a first actuator plate rotatable about an axis and having an arm segment with a cam surface formed thereon, a second actuator plate rotatable about said axis for angular movement relative to said first actuator plate, a cam arrangement operable for causing axial movement of said second actuator plate in response to relative rotation between said first and a second actuator plates, and a piston assembly engaging said cam surface such that movement of said piston assembly between first and second positions causes corresponding relative angular movement of said first and second actuator plates between first and second angular positions so as to cause corresponding axial movement of said second actuator plate relative to said friction clutch, said drive mechanism including a power-operated device for controlling movement of said piston assembly between its first and second positions.

26. The power transfer unit of claim 25 wherein said second actuator plate is located in a first axial position relative to said first actuator plate when said first and second actuator plates are rotated to their first angular position so as to apply a minimum clutch engagement force on said friction clutch, and wherein said second actuator plate is located in a second axial position relative to said first actuator plate when said first and second actuator plates are rotated to their second angular position so as to apply a maximum clutch engagement force on said friction clutch.

27. The power transfer unit of claim 25 wherein said second actuator plate includes a second arm segment having a second cam surface formed thereon, wherein said piston assembly further includes a second piston engaging said second cam surface, and wherein said power-operated device is operable for causing coordinated movement of said first and second pistons.

28. The power transfer unit of claim 25 wherein said piston assembly is disposed for movement in a pressure chamber and wherein said power-operated device includes a motor-driven fluid pump in fluid communication with said pressure chamber.

29. The power transfer unit of claim 25 wherein said power-operated device includes an electric motor having a motor output operable for moving a control piston disposed in a control chamber and a fluid delivery system providing fluid communication between said control chamber and a pressure chamber, and wherein said piston assembly is disposed for movement in said pressure chamber.

30. A power transfer unit for use in a motor vehicle having a powertrain and first and second drivelines, comprising:
a rotary input driven by the powertrain;
a first rotary output driven by said input and coupled to the first driveline;
a second rotary output coupled to the second driveline;
a friction clutch operably disposed between said first and second outputs; and
a clutch actuator for applying a clutch engagement force on said friction clutch and including an operator mechanism and a drive mechanism, said operator mechanism including a first actuator plate rotatable about an axis and having an arm formed with a cam surface, a second actuator plate rotatable about said axis for angular movement relative to said first actuator plate, a ballramp unit disposed between said first and second actuator plates, and a piston assembly engaging said cam surface to induce rotation of said first actuator plate so as to cause said ballramp unit to axially move said second actuator plate relative to said friction clutch, said drive mechanism including a power-operated device for controlling movement of said piston assembly.

31. The power transfer unit of claim 30 wherein said second actuator plate is rotatable about said axis and includes a second arm that extends from said second actuator plate, and wherein said piston assembly acts on said second arm to induce rotation of said second actuator plate.

32. The power transfer unit of claim 31 wherein said second arm includes a second cam surface and said piston assembly also engages said second cam surface to induce rotation of said second actuator plate, and wherein said piston assembly includes first and second piston, said first piston acting on said first actuator plate and said second piston acting on said second actuator plate.

33. The power transfer unit of claim 30 wherein said piston assembly is disposed within a pressure chamber, and wherein said power-operated device includes a motor-driven fluid pump in fluid communication with said pressure chamber.

34. The power transfer unit of claim 30 wherein said piston assembly is disposed within a pressure chamber, and wherein said power-operated device includes an electric motor having an output operable for moving a control piston disposed in a control chamber and a fluid delivery system providing fluid communication between said control chamber and said pressure chamber.

35. A power transfer unit for use in a motor vehicle having a powertrain and first and second drivelines, comprising:
 a rotary input driven by the powertrain;
 a first rotary output driven by said input and coupled to the first driveline;
 a second rotary output coupled to the second driveline;
 a friction clutch operably disposed between said first and second outputs;
 a clutch actuator for applying a clutch engagement force to said friction clutch, said clutch actuator including a first actuator plate rotatably supported on one of said first and second rotary members for rotation about an axis, said first actuator plate having an arm segment with a cam surface thereon, a second actuator plate rotatable about said axis for angular movement relative to said first actuator plate, a ball ramp unit disposed between said first and second actuator plates, and a linear operator engaging said cam surface such that movement of said linear operator between first and second positions causes said ball ramp unit to cause corresponding angular movement of said first and second actuator plates between first and second angular positions so as to cause corresponding axial movement of said second actuator plate relative to said friction clutch; and
 a power-operated drive mechanism for controlling movement of said linear operator.

* * * * *